Oct. 19, 1965  R. E. McMINN  3,212,234
SEPARATION METHOD AND APPARATUS
Filed March 20, 1961  2 Sheets-Sheet 1
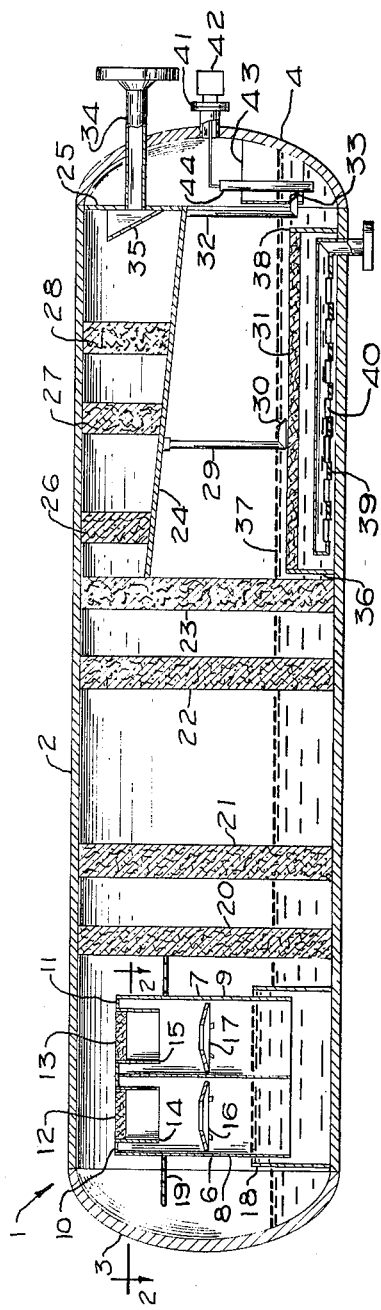
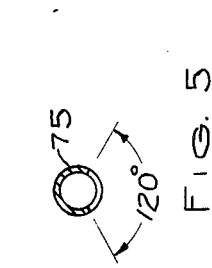
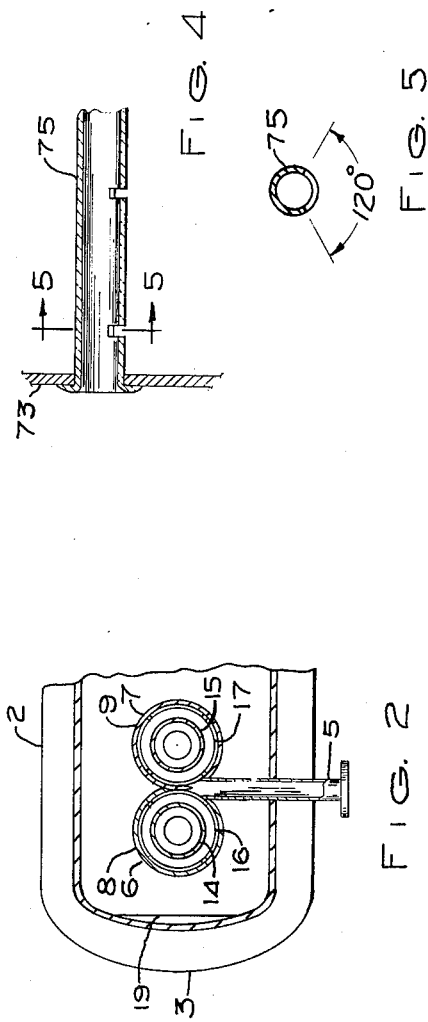
ROBERT E. McMINN
*INVENTOR.*
BY
*Jack R. Springate*
ATTORNEY ROBERT E. McMINN
INVENTOR.

3,212,234
SEPARATION METHOD AND APPARATUS
Robert E. McMinn, Oklahoma City, Okla., assignor to Black, Sivalls & Bryson, Inc., Kansas City, Mo., a corporation of Delaware
Filed Mar. 20, 1961, Ser. No. 96,774
7 Claims. (Cl. 55—38)

The present invention relates generally to oil and gas separators and specifically to the separation of gas from a petroleum oil in which the gas is suspended in the oil in the form of foam or froth.

Some petroleum products when produced from a well contain impurities which cuase the oil and gas mixture to combine in the form of gas bubbles or foam. Due to the type of production and the wellhead equipment, the gas is intimately mixed with the oil, usually in the wellhead choke. Such oil production requires special attention to completely separate the gas from the oil. The usual methods and equipment for oil and gas separation will not satisfactorily separate foaming oils. When adequate separation equipment is not used, a quantity of the oil will be discharge with the gas and a portion of the gas will be discharged with the oil. Such incomplete separation is costly since the oil which is discharged with the gas will be lost and will mean a loss of revenue and the gas discharged with the oil will also be a loss since it will not be available for sale or even for use on the lease. Another disadvantage of this incomplete separation is the oil with the gas included in it will not be suitable for metering or sale and will probably have to be further separated or will need to stand in a stock tank until substantially all of the gas has separated from the oil. In many types of foaming oil the gas bubbles may be so minute that they will not break out even when the oil stands in a tank for a substantial length of time. Such oil is not suitable for use or transportation through a pipeline.

Prior to the present invention many methods and apparatus for the separation of gas from oil have been conceived and used. To date none of these devices or methods have been completely successful when used on oils which have an extreme tendency to form foam. Therefore it is the primary object of the present invention to provide a method and an apparatus for the separation of gas from oil where the oil and gas are produced in the form of foam.

A further object of the present invention is to provide a new and novel method and apparatus for separating gas from foaming oil in which multiple separations are performed to assure that the oil and gas are discharged separately from the device free from each other. Another object of the present invention is to provide a novel oil and gas separator for foaming oils in which the inlet separation section of the separator includes a mist extraction element to prevent the carryover of oil in the form of foam with the gas initially separated from the oil. A still further object of the present invention is to provide a new and novel apparatus including a plurality of individual foam breaking and mist eliminating devices. Still another object of the present invention is to provide a new and novel foam separator having a plurality of mist eliminators to remove the entrained liquids from the gas stream and a plurality of bubble eliminators to remove the entrained gas from the oil.

These and other objects of the present invention are hereinafter more fully explained and described in the accompanying drawings wherein:

FIG. 1 is a vertical longitudinal sectional view of the preferred form of the present invention.

FIG. 2 is a partial sectional view of the inlet sections of the device illustrated in FIG. 1 taken along lines 2—2.

FIG. 4 is a detailed sectional view of a portion of the modified form of the invention illustrated in FIG. 3.

FIG. 5 is a sectional view taken along lines 5—5 in FIG. 4.

Figure 3:
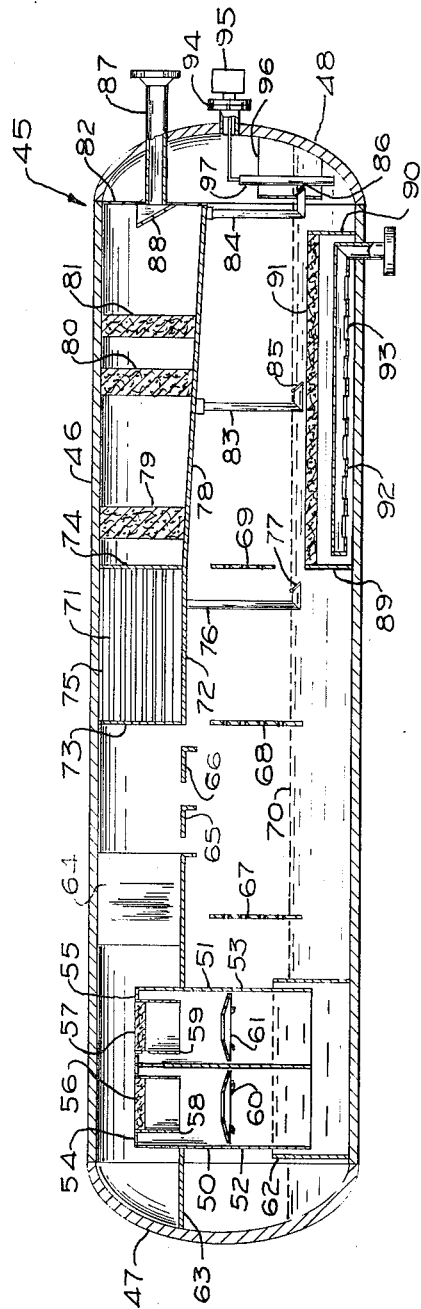
FIG. 3 is a vertical longitudinal sectional view of a modified form of the present invention.

Referring more in detail to the drawings:

Vessel 1 as shown in FIG. 1 is a cylindrical vessel positioned horizontally and is composed of shell 2 which is closed by heads 3 and 4. Inlet 5 extends horizontally through shell 2 near head 3 and connects into walls 6 and 7 of cyclones 8 and 9 respectively. Cyclones 8 and 9 are constructed identically except that inlet 5 connects into the adjacent sides so that the swirling of the wellstream in cyclone 8 will be counterclockwise when viewed from above as shown in FIG. 2. The upper parts of cyclones 8 and 9 are closed by annular plates 10 and 11 and mist eliminators 12 and 13 respectively. Cylindrical baffles 14 and 15 depend from the inner edges of annular plates 10 and 11 and terminate a short distance above splash plates 16 and 17. Splash plates 16 and 17 are secured to the inner surface of walls 6 and 7 respectively but have portions of their peripheries which are spaced from walls 6 and 7 to allow liquids collecting thereon to drain to the lower portion of cyclones 8 and 9 without interfering with the passage of gas upwardly through the hole in the center of each of splash plates 16 and 17.

The lower edges of walls 6 and 7 terminate in spaced relationship to the lower inner surface of vessel 1. Weir box 18 is secured to the lower inner surface of vessel 1. The upper level of weir box 18 is positioned at a level in vessel 1 above the lower edges of walls 6 and 7 of cyclones 8 and 9. Also, weir box 18 surrounds cyclones 8 and 9 to provide a liquid seal so that the gas in the incoming wellstream will have to flow out of cyclones 8 and 9 through mist eliminators 12 and 13. Cyclones 8 and 9 are held in position by inlet 5 and by horizontal support member 19 which is secured to the inner surface of vessel 1.

Wire mesh pads 20 and 21 are positioned within shell 2 and are circular in shape extending out to the inner surface of shell 2 to prevent any oil, foam or gas from bypassing pads 20 and 21. Wire mesh pad 20 is spaced from weir box 18 and wire mesh pad 21 is spaced from pad 20. A second pair of wire mesh pads 22 and 23 are similarly positioned in vessel 1 with pad 22 being spaced a substantial distance from pad 21 and pad 23 spaced from pad 22 a relatively short distance. Pads 20, 21, 22 and 23 are a type of knitted wire mesh with the proper closeness of mesh to assist in the breaking of the foam but not a mesh sufficiently close woven to cause excessive pressure drop of the gas flowing through such pads. It has been discovered that this type of pad will greatly assist in the breaking of the foam bubbles both in the gas space and in the oil. Generally it is preferred that the pads be made of the same general type and size of knitted wire but it is within the scope of the present invention to utilize a varying mesh for the pads in accordance with the requirements of each application.

Partition 24 extends across the upper portion of shell 2 spaced from pad 23. Vertical partition 25 extends upwardly from the end of partition 24 nearest head 4. Both partitions 24 and 25 are welded securely to shell 2 or otherwise suitably secured and sealed to prevent the passage of any gas or oil around these partitions. Mist eliminators 26, 27 and 28 are positioned on partition 24 in spaced relationship to each other with each mist eliminator completely blocking the flow area above partition 24. Drain tube 29 extends through partition 24 between mist eliminators 26 and 27 and extends downwardly into the liquid area below partition 24 with a flapper 30 on its lower end which is positioned immediately above horizontal wire mesh pad 31. Partition 24 is installed within vessel 1 to slope downwardly in the direction toward head 4. Drain tube 32 extends through partition 24 at a point adjacent partition 25 and has its lower end in the lower portion of vessel 1 as hereinafter more fully explained. Flapper 33 covers the lower end of tube 32. Gas outlet 34 extends through partition 25 and head 4. The inner end of gas outlet 34 is covered by baffle 35 which opens upwardly to cause any gas flowing to gas outlet 34 to flow upwardly over baffle 35 before being discharged from vessel 1.

Vertical partition 36 is positioned immediately adjacent pad 23 in the lower portion of vessel 1 below partition 24. The upper edge of vertical partition 36 terminates below liquid level 37 and provides a chamber in the lower portion of vessel 1 for the collection of gas-free liquid for discharge from vessel 1. Secured to vertical partition 36 and extending to vertical partition 38 is wire mesh pad 31 or other suitable device for removing gas bubbles from oil. Liquid discharge tube 39 is positioned below wire mesh pad 31 and between partitions 36 and 38. Liquid discharge tube 39 is provided with slots 40 along its lower side for withdrawing oil from a position below tube 39 in vessel 1.

Flanged connection 41 is provided in head 4 for liquid level control 42. Float box 43 is secured to the inner surface of head 4 and is open at its upper and lower extremities. It should be noted that flapper 33 of drain tube 32 is within float box 43. Float 44 is positioned within float box 43 which protects float 44 from any turbulence in the liquid within vessel 1 and also prevents foam from collecting around float 44 which might cause float 44 to give a false indication of the height of liquid level 37.

In FIG. 3 vessel 45 is similar to vessel 1 in that it is horizontally disposed, is composed of a cylindrical shell 46, heads 47 and 48 and has a gas inlet structure similar to that shown in FIGS. 1 and 2. Inlet 49 extends horizontally into shell 46 near head 47 and connects through walls 50 and 51 of cyclones 52 and 53 respectively. Cyclones 52 and 53 are constructed identically except that inlet 49 connects into the adjacent sides so that the swirling of the wellstream in cyclone 52 will be counter-clockwise and the swirling of the wellstream in cyclone 53 will be clockwise when viewed from above. The upper parts of cyclones 52 and 53 are closed by annular plates 54 and 55 and mist eliminators 56 and 57 respectively. Cylindrical baffles 58 and 59 depend from the inner edges of annular plates 54 and 55 and terminate a short distance above splash plates 60 and 61. Splash plates 60 and 61 are secured to the inner surface of walls 50 and 51 to allow liquids collecting thereon to drain to the lower portion of cyclones 52 and 53 without interfering with the passage of gas upwardly through the hole in the center of each of splash plates 60 and 61.

The lower edges of walls 50 and 51 terminate in spaced relationship to the lower inner surface of vessel 45. Weir box 62 is secured to the lower inner surface of vessel 45. The upper level of weir box 62 is positioned at a level in vessel 45 above the lower edges of walls 50 and 51 of cyclones 52 and 53. Also, weir box 62 surrounds cyclones 52 and 53 to provide a liquid seal so that the gas in the incoming wellstream will have to flow from cyclones 52 and 53 through mist eliminators 56 and 57. Cyclones 52 and 53 are held in position by horizontal support member 63 which is secured to the inner surface of vessel 45. Support member 63 extends beyond cyclones 52 and 53 and provides a base plate for straightening vanes 64. Baffles 65 and 66 are positioned horizontally across vessel 45 at the same level as support member 63. Baffle 65 is spaced a short distance from support member 63 to allow any liquid collecting on support member 63 to drain into the lower portion of vessel 45. Baffle 66 is also spaced from baffle 65 for the same purpose. Both baffles 65 and 66 have a depending flange on their sides away from support member 63. Perforated baffles 67, 68 and 69 are positioned vertically in the lower portion of vessel 45 under support member 63 and baffles 65 and 66 are spaced from each other as shown. The upper edges of perforated baffles 67, 68 and 69 are spaced from the lower portion of vessel 45 but baffles 67 and 68 extend downwardly to have their lower edges positioned below liquid level 70.

Tube section 71 is mounted on support plate 72 and comprises tube sheets 73 and 74 and tubes 75. Each of tubes 75 is transversely slotted on its lower periphery for about 120 degrees and is slotted in several positions along its length as best shown in FIGS. 4 and 5. Each of tubes 75 extend through both tube sheets 73 and 74 in a manner similar to boiler tubes or tubes in a heat exchanger. Drain tube 76 connects through support plate 72 and extends into the lower portion of vessel 45 below tube section 71. The lower end of drain tube 76 is closed by flapper 77 which serves as a check valve to prevent the flow of gas and foam upwardly through drain tube 76. Secured to the end of support plate 72, extending toward head 48 and sloped slightly downwardly as best shown in FIG. 3 is partition 78. Mist eliminators 79, 80 and 81 are positioned as shown between partition 78 and the upper inner surface of shell 46 to remove any entrained liquid droplets from the gas stream.

Partition 78 extends to vertical partition 82. Vertical partition 82 is secured to partition 78 and extends upwardly, being welded or otherwise suitably secured to the inner surface of vessel 45. Thus, support plate 72, partition 78 and vertical partition 82 form an entrainment elimination section which is separate from the rest of vessel 45 and with all edges being suitably welded to the inner surface of vessel 45 to prevent the flow of gas from the lower portion of vessel 45 into this entrainment elimination section. If any mist bearing gas were to leak into this entrainment elimination section, then the effectiveness of the mist eliminators and the tube section 71 would be substantially reduced. Drain tubes 83 and 84 are provided to drain any liquids collecting on the upper surface of partition 78 into the lower portion of vessel 45. The lower extremities of both drain tubes 83 and 84 are positioned below liquid level 70 as is the lower extremity of drain tube 76. Drain tubes 83 and 84 are also provided with flappers 85 and 86 to act as check valves to prevent the flow of gas upwardly through drain tubes 83 and 84. Gas outlet duct 87 extends through head 48 and vertical partition 82 to discharge gas from vessel 45. The open inner end of gas outlet duct 87 is positioned behind upwardly sloping baffle 88 which serves to prevent formation of a vortex caused by gas flowing out from the area formed by partition 78 and shell 46. Such a vortex would re-entrain liquid flowing on partition 78 and carry it out through gas outlet duct 87.

Vertical partition 89 is positioned in the lower portion of vessel 45 immediately below perforated baffle 69. The upper edge of vertical partition 89 terminates below liquid level 70 and provides a chamber in the lower portion of vessel 45 for the collection of gas-free liquid for discharge from vessel 45. Secured to vertical partition 89 and extending to vertical partition 90 is wire mesh pad 91 or other suitable material for removing gas bubbles from oil. Liquid discharge tube 92 is positioned below pad 91 and between partitions 89 and 90. Tube 92 is provided with slots 93 along its lower side for withdrawing oil from a position below tube 92 in vessel 45. Flanged connection 94 is provided in head 48 for liquid level control 95. Float box 96 is secured to the inner surface of head 48 and is open at its upper and lower extremities. Float 97 is positioned within float box 96 which protects float 97 from any turbulence in the liquid within vessel 45 and also prevents foam from collecting around float 97 which might cause float 97 to give a false indication of the height of liquid level 70.

In operation the influent wellstream flow is similar in both forms of the invention illustrated. In reference to vessel 1 of FIGS. 1 and 2 the influent wellstream is conducted through inlet 5 and is discharged into cyclones 8 and 9. The flow in each of these cyclones is the same except for the direction of rotation of the flow as previously mentioned. The fluid stream will flow around the inner surface of wall 6 of cyclone 8 with a substantial portion of the liquid component of the fluid stream being forced into contact with the inner surface of wall 6 by the centrifugal force of the rotation. These liquids will flow downwardly on wall 6, through the space between wall 6 and splash plate 16 and into the liquid collected in weir box 18. The gaseous component of the fluid stream flowing into cyclone 8 will flow around in the space between wall 6 and cylindrical baffle 14. The gas flowing under cylindrical baffle 14 will flow upwardly and out of cyclone 8 through mist eliminator 12. The gas stream flows from cyclones 8 and 9 through wire mesh pads 20, 21, 22 and 23 and above partition 24 through mist eliminators 26, 27 and 28 to be discharged from vessel 1 through gas outlet 34. Wire mesh pads 20, 21, 22 and 23 are designed to perform a dual function. First, their primary function is to provide a surface on which the liquid has surrounded some gas forming a bubble will collect whereby the liquid film is broken and the gas is released. The secondary function of these pads is to provide a primary removal of any entrained liquids being carried by the gas stream while the final mist elimination from the gas stream will be accomplished by mist eliminators 26, 27 and 28. Liquid which has been separated from the gas stream above partition 24 is drained into the lower portion of vessel 1 through drain tubes 29 and 32. As previously mentioned the lower ends of drain tubes 29 and 32 are provided with flappers 30 and 33 respectively to prevent the flow of any gas or foam upwardly therethrough.

The liquid and foam within cyclones 8 and 9 flow downwardly and collect within weir box 18. As the level of liquid within weir box 18 builds up it is forced to flow under the lower edges of walls 6 and 7 and then upwardly to overflow the upper edge of weir box 18. The liquid then flows through pads 20, 21, 22 and 23. As previously mentioned the function of these pads is to break the foam. This requires that it break the liquid film to release the gas trapped within the foam bubbles. The liquid, after flowing through pad 23, will overflow partition 36 and collect above wire mesh pad 31. Since any oil containing foam will be lighter than the foam-free oil, only the foam-free oil will settle through pad 31 for discharge from vessel 1 through liquid discharge tube 39. Pad 31 further serves the function of removing the smallest bubbles of gas which may be contained in the oil after it has passed through pads 20, 21, 22 and 23. The slots 40 provided in liquid discharge tube 39 are designed to withdraw oil only from the extreme lower portion of vessel 1 between partitions 36 and 38. A rapid withdrawal through a pipe opening within the lower portion of a vessel might be localized to the extent that a portion of the oil containing gas would be drawn through pad 31 without obtaining complete removal of such gas bubbles. The discharge of the liquid is controlled by liquid level controller 42 in response to the level of liquid as sensed by float 44. Suitable valving (not shown) should be positioned into the connection for liquid discharge tube 39 in such a manner as to be controlled by liquid level controller 42.

With regard to the operation of the form of the present invention shown in FIG. 3 the fluid stream is conducted into vessel 45 through inlet 49 into cyclones 52 and 53. The flow in each of these cyclones is the same except for the direction of rotation of the flow as previously mentioned. The fluid stream will flow around the inner surface of well 50 of cyclone 52 with a substantial portion of the liquid component of the fluid stream being forced into contact with the inner surface of wall 50 by the centrifugal force of the rotation. These liquids will flow downwardly on wall 50, through the space between wall 50 and splash plate 60 and into the liquid collected in weir box 62. The gaseous component of the fluid stream flowing into cyclone 52 will flow around the space between wall 50 and cylindrical baffle 58. The gas flowing under cylindrical baffle 58 will flow upwardly and out of cyclone 12 through mist eliminator 56. The gas stream flows from cyclones 52 and 53 through straightening vanes 64 and into tubes 75 in tube section 71. Any liquids which are removed from the gas stream ahead of tube section 71 will drain into the lower portion of vessel 45 through the spaces between support member 63 and baffle 65 and between baffle 65 and baffle 66. It is well known that in attempting separation of foaming oils that the initial separation such as performed in cyclones 52 and 53 will not completely free the gas stream of the liquid foam and entrained liquid droplets. Further, when excess foaming conditions are encountered, it is not unlikely that the foam will rise within vessel 45 through the spaces between baffles 65 and 66. Therefore, tube section 71 has been designed to resolve any froth or foam which is carried into the upper portion of vessel 45. The operation of tubes 75 in resolving the foam or froth depends on the greater surface tension of liquids as compared to gases. Foam entering one of tubes 75 will separate into its gaseous and liquid phases by means of the film of oil surrounding the gas bubble adhering to the tube surface and gas velocity tearing the bubble open. As the depth of this film grows, it will run to the bottom of tube 75 and form a drop of sufficient size to drop to the upper side of support plate 72 flowing to drain tube 76. It is then drained into the lower portion of vessel 45 through flapper 77. The gas then flows through mist eliminators 79, 80 and 81, over baffle 88 and through gas outlet duct 87. Mist eliminators 79, 80 and 81 are designed to remove as much as possible of the extremely fine droplets of entrained mist and any gas bubbles which may have passed through tube section 71.

The oil flow within cyclones 52 and 53 is downwardly on walls 50 and 51 into weir box 62. As the level of oil in weir box 62 builds up, the oil will overflow. Perforated partitions 67, 68 and 69 are provided to retard the flow of foam through the lower portion of vessel 45. A large volume of space is available in this section of vessel 45 to accommodate the foam. Partitions 67, 68 and 69 are also spaced from the lower portion of vessel 45 to allow the oil from which most or all of the gas has been removed to flow through vessel 45 toward vertical partition 87. This oil flows over vertical partition 87 and down through wire mesh pad 91 into the zone of oil collecting thereunder between vertical partition 87 and vertical partition 90. Oil is discharged from vessel 45 through slots 93 and liquid discharge tube 92. With perforated baffles 67, 68 and 69 retaining the foam in vessel 45 away from discharge tube 92 and by causing the oil to be discharged from vessel 45 to flow through wire mesh pad 91 prior to discharge, the discharged oil is free of gas to a much greater degree than was possible with devices which were used prior to the present invention. Also, the gas flowing from vessel 45 is free of oil and entrained liquids to a much greater degree than was possible with devices which were used prior to the present invention to separate gas from oil when the oil has a tendency to foam or froth.

Thus, it can be seen from the foregoing that the present invention provides a new and novel method and apparatus for the separation of gas from a foaming oil. This invention will provide separation of gas and oil from a foaming oil stream in which substantially all of the oil is removed from the gas before it is discharged and substantially all of the gas is removed from the oil before it is discharged.

What I claim and desire to secure by Letters Patent is:

1. The method of separating the gaseous component and the liquid component from a foaming fluid stream comprising,
   initially subjecting said foaming fluid stream to centrifugal force to provide an initial separation,
   stratifying said fluid stream after said initial separation,
   flowing all of said stratified fluid stream through a first knitted mesh pad to separate the foam components,
   stratifying said fluid stream after said first form breaking stage,
   flowing all of said stratified fluid stream through a second knitted mesh pad to further separate the foam components, and
   thereafter separating said gaseous component and said liquid component from the fluid stream flowing from said second mesh pad.

2. The method according to claim 1, together with the steps of,
   flowing separated gas through a mist extracting section to remove entrained liquid from the gas, and
   flowing the liquid extracted from said separated gas into the separated liquid.

3. An apparatus for separating gas and oil from a foaming crude oil stream comprising,
   a substantially horizontal vessel,
   an inlet into said vessel,
   an inlet chamber in said vessel having a centrifugal separator in said chamber,
   a first foam breaking pad positioned transversely of said vessel,
   a second foam breaking pad positioned transversely of said vessel and spaced from said first foam breaking pad,
   each of said foam breaking pads including knitted mesh having a texture to distort and cause rupture of the foam oil film holding gas therein,
   an oil and gas accumulating chamber in said vessel on the side of said second pad away from said first foam breaking pad,
   a sole gas outlet from said vessel extending from said accumulating chamber, and
   a sole oil outlet from said vessel extending from said accumulating chamber,
   said foam breaking pads positioned across the interior of said vessel whereby all fluids entering said vessel flow through said foam breaking pads before discharge from said vessel,
   the interior of said vessel being substantially unobstructed except by said foam breaking pads between said inlet chamber and said accumulating chamber.

4. An apparatus according to claim 3 including,
   a plurality of mist eliminator elements positioned in said accumulating chamber in the flow path of the separated gas to said sole gas outlet.

5. An apparatus according to claim 3 wherein said centrifugal separator comprises,
   a pair of cyclone separators positioned in said inlet chamber,
   said inlet connecting into said pair of cyclone separators,
   said cyclone separators having means providing relatively quiescent discharge of fluids therefrom into said inlet chamber.

6. An apparatus according to claim 3 wherein,
   said foam breaking pads comprise a knitted wire mesh.

7. An apparatus according to claim 3 wherein said centrifugal separator comprises,
   a pair of cyclone separators into which said inlet is connected,
   each of said pair of cyclone separators comprising,
      an outer cylindrical shell positioned adjoining the outer cylindrical shell of the other of said pair of cyclone separators,
      an inner cylindrical shell positioned within each of said outer cylindrical shells, being sealed at its upper extremity to the outer cylindrical shell in which it is positioned, and
      a baffle plate positioned within each of said outer cylindrical shells of said pair of cyclone separators below the lower extremity of said inner cylindrical shells,
      said baffle plates being annular in shape with their outer edges spaced slightly from the interior of said outer cylindrical shells.

References Cited by the Examiner

UNITED STATES PATENTS

| | | | |
|---|---|---|---|
| 1,556,592 | 10/25 | Donaldson | 55—426 |
| 2,297,297 | 9/42 | Walker | 55—42 |
| 2,420,115 | 5/47 | Walker et al. | 252—361 X |
| 2,601,904 | 7/52 | Erwin | 55—45 X |
| 2,610,697 | 9/52 | Lovelady et al. | 55—174 X |
| 2,656,896 | 10/53 | Glasgow | 55—174 |
| 2,664,963 | 1/54 | Lovelady et al. | 55—176 X |
| 2,692,655 | 10/54 | Peeps | 55—315 X |
| 2,706,531 | 4/55 | Lovelady et al. | 55—174 |
| 2,710,071 | 6/55 | Kinser et al. | 55—174 X |
| 2,713,919 | 7/55 | Walker et al. | 55—45 X |
| 2,753,011 | 7/56 | Downs | 55—204 |
| 2,783,854 | 3/57 | Lovelady et al. | 55—174 |
| 2,812,034 | 11/57 | McKelvey | 55—186 |
| 2,868,315 | 1/59 | Chaple et al. | 55—186 |
| 2,899,014 | 8/59 | Sinex | 55—186 X |
| 2,910,136 | 10/59 | Valliant et al. | 55—462 X |
| 3,008,538 | 11/61 | Glasgow | 55—186 |

REUBEN FRIEDMAN, *Primary Examiner.*

HARRY B. THORNTON, HERBERT L. MARTIN,
*Examiners.*